United States Patent
Wise (10) Patent No.: US 12,041,361 B2
(45) Date of Patent: Jul. 16, 2024

(54) GENERATING TRAINING DATA USING BEAM SPLITTER WITH MULTIPLE RESOLUTION SENSORS

(71) Applicants: Sony Corporation, Tokyo (JP); Sony Pictures Entertainment Inc., Culver City, CA (US)

(72) Inventor: Joseph Wise, Los Angeles, CA (US)

(73) Assignees: Sony Group Corporation, Tokyo (JP); Sony Pictures Entertainment Inc., Culver City, CA (US)

( * ) Notice: Subject to any disclaimer, the term of this patent is extended or adjusted under 35 U.S.C. 154(b) by 82 days.

(21) Appl. No.: 17/067,154

(22) Filed: Oct. 9, 2020

(65) Prior Publication Data
US 2021/0185225 A1    Jun. 17, 2021

Related U.S. Application Data (60) Provisional application No. 62/947,767, filed on Dec. 13, 2019.

(51) Int. Cl.
*H04N 23/951* (2023.01)
*G06N 20/00* (2019.01)
*H04N 7/01* (2006.01)
*H04N 23/90* (2023.01)

(52) U.S. Cl.
CPC ........... *H04N 23/951* (2023.01); *G06N 20/00* (2019.01); *H04N 7/0117* (2013.01); *H04N 23/90* (2023.01)

(58) Field of Classification Search
CPC .. H04N 5/23232; H04N 5/247; H04N 7/0117; G06N 20/00
See application file for complete search history.

(56) References Cited

U.S. PATENT DOCUMENTS

| 7,151,801 | B2 | 12/2006 | Grossberg et al. |
| 2018/0157930 | A1* | 6/2018 | Rutschman ............. H04N 5/33 |
| 2019/0208181 | A1 | 7/2019 | Rowell et al. |

OTHER PUBLICATIONS https://www.dft-film.com/downloads/datasheets/DFT-Spirit-4K-datasheet-11-09.pdf, (2005), 8 pgs.

* cited by examiner

*Primary Examiner* — Nicholas G Giles
(74) *Attorney, Agent, or Firm* — Procopio, Cory, Hargreaves & Savitch LLP (57) ABSTRACT

Systems, methods, and apparatus to generate training data include receiving a beam of light reflected from a subject and splitting the beam of light into at least a first beam and a second beam; directing the first beam toward a first sensor and the second beam toward a second sensor; sensing and processing the first beam to generate a first video having a first characteristic; sensing and processing the second beam to generate a second video having a second characteristic; and processing the first video and the second video to generate training data.

13 Claims, 4 Drawing Sheets

GENERATING TRAINING DATA USING BEAM SPLITTER WITH MULTIPLE RESOLUTION SENSORS

CROSS-REFERENCE TO RELATED APPLICATIONS

This application claims the benefit of priority under 35 U.S.C. § 119(e) of co-pending U.S. Provisional Patent Application No. 62/947,767, filed Dec. 13, 2019, entitled "Beam Splitter with Multiple Resolution Cameras." The disclosure of the above-referenced application is incorporated herein by reference.

BACKGROUND

Field

The present disclosure relates to generating training data for developing a video conversion process, and more specifically, to generating training data for a video conversion process using a beam splitter and multiple resolution sensors.

Background

In video production, it is important to synchronize the data collected from the cameras and sensors. The collected data may be synchronized using the positions of the cameras and sensors. However, calibrating the cameras and sensors to control the positions can be difficult.

SUMMARY

The present disclosure provides for generating training data for developing a video conversion process.

In one implementation, a system to generate training data is disclosed. The system includes: a beam splitter to receive a beam of light reflected from a subject, and to split the beam of light into two identical beams, a first beam and a second beam; a plurality of sensors including a first sensor and a second sensor, the first sensor configured to sense and process the first beam from the beam splitter to generate a first video having a first characteristic, and the second sensor configured to sense and process the second beam from the beam splitter to generate a second video having a second characteristic; and a processor to receive the first video and the second video, and to generate the training data.

In one implementation, the processor further includes a formatter to format the first video and the second video into the training data for a machine learning system. In one implementation, the machine learning system uses the training data in a video conversion process. In one implementation, the video conversion process receives an asset having the first characteristic and stored in an archive. In one implementation, the archive includes a television archive including one or more assets for television programs or other television content. In one implementation, the video conversion process converts the asset from the first characteristic to the second characteristic using the training data. In one implementation, the first characteristic and the second characteristic include first resolution and second resolution, respectively. In one implementation, the first sensor and the second sensor are configured as programmable sensors to sense different characteristics including color. In one implementation, the plurality of sensors includes a combination of cameras and sensors. In one implementation, the sensors include at least one of infra-red (IR) sensors, laser sensors, and laser imaging, detection, and ranging (LIDAR) sensors.

In another implementation, a method to generate training data is disclosed. The method includes: receiving a beam of light reflected from a subject and splitting the beam of light into at least a first beam and a second beam; directing the first beam toward a first sensor and the second beam toward a second sensor; sensing and processing the first beam to generate a first video having a first characteristic; sensing and processing the second beam to generate a second video having a second characteristic; and processing the first video and the second video to generate training data.

In one implementation, the method further includes transmitting the training data to a machine learning system. In one implementation, the machine learning system includes a video conversion process. In one implementation, the method further includes receiving by the video conversion process an asset having the first characteristic and stored in an archive. In one implementation, the archive includes a television archive including one or more assets for television programs or other television content. In one implementation, the method further includes converting by the video conversion process the asset from the first characteristic to the second characteristic using the training data.

In a further implementation, an apparatus to generate training data is disclosed. The apparatus includes: means for receiving a beam of light reflected from a subject and splitting the beam of light into at least a first beam and a second beam; means for sensing and processing the first beam to generate a first video having a first characteristic; means for sensing and processing the second beam to generate a second video having a second characteristic; and means for processing the first video and the second video to generate training data.

In one implementation, the apparatus further includes means for transmitting the training data to a machine learning system. In one implementation, the apparatus further includes means for receiving an asset having the first characteristic and stored in an archive. In one implementation, the apparatus further includes means for converting the asset from the first characteristic to the second characteristic using the training data.

Other features and advantages should be apparent from the present description which illustrates, by way of example, aspects of the disclosure.

BRIEF DESCRIPTION OF THE DRAWINGS

The details of the present disclosure, both as to its structure and operation, may be gleaned in part by study of the appended drawings, in which like reference numerals refer to like parts, and in which.

DETAILED DESCRIPTION

Converting video from one resolution, format, and/or other related characteristic (e.g., display mode, display size, etc., collectively referred to as "resolution") to another with desirable results can be difficult. Machine learning may be a useful tool to improve automated processes for this type of conversion. Creating good sample data as training data may also be important for improving the machine learning process.

In generating the training data, it is important to synchronize the data collected from the cameras and sensors (collectively referred to as "sensors") in video production and/or studio environment. The collected data may be synchronized using the positions of the sensors. However, calibrating the sensors to control the positions can be difficult. For example, to match the spatial perspectives of the data from the sensors, the positions of the sensors (i.e., one camera with a first resolution and another camera with a second resolution) need to be calibrated in order to synchronize the first resolution data with the second resolution data.

Certain implementations of the present disclosure provide systems, methods, and apparatus to generate training data for developing a video conversion process. Initially, the input image of a subject may be captured and processed using two sensors having different resolutions connected to a beam splitter which splits the input image into two identical images. Thus, the beam splitter provides an identical spatial perspective for the two images. Therefore, the identical spatial perspective for the two images obviates the need for the calibration of the positions of the two sensors. The system may then use the two video streams (generated from the two images) as training data for developing a video conversion process in a machine learning system.

After reading the below descriptions, it will become apparent how to implement the disclosure in various implementations and applications. Although various implementations of the present disclosure will be described herein, it is understood that these implementations are presented by way of example only, and not limitation. As such, the detailed description of various implementations should not be construed to limit the scope or breadth of the present disclosure.

As indicated above, converting video from one resolution to another resolution with desirable results can be difficult. Machine learning may be a useful tool to improve automated processes for this type of conversion.

Generating good sample data as training data may be important for improving the machine learning process.

Toward the goal of generating good training data, in one implementation, an input data of the subject is captured and processed using two or more sensors (e.g., a first sensor and a second sensor) having different resolutions coupled to a beam splitter. The beam splitter splits the input data into two identical images having an identical spatial perspective. Each sensor coupled to the beam splitter may receive one input image of the two identical images and generate a different resolution of the input image. For example, the first sensor may generate a first resolution data, while the second sensor may generate a second resolution data.

Since the input images received by the sensors have same spatial perspective, there may not be a need to calibrate the first and second sensors in order to synchronize the first resolution data with the second resolution data. Therefore, the first resolution data and the second resolution data are used to generate two training video streams for developing a video conversion process in a machine learning system. In one example, the first training video stream is the standard definition (SDTV, such as 480i) video stream and the second training video stream is the high definition (HDTV, such as 1080p) video stream. Accordingly, these two training video streams are better candidates for machine learning training datasets than datasets recorded from separate locations.

Figure 1:
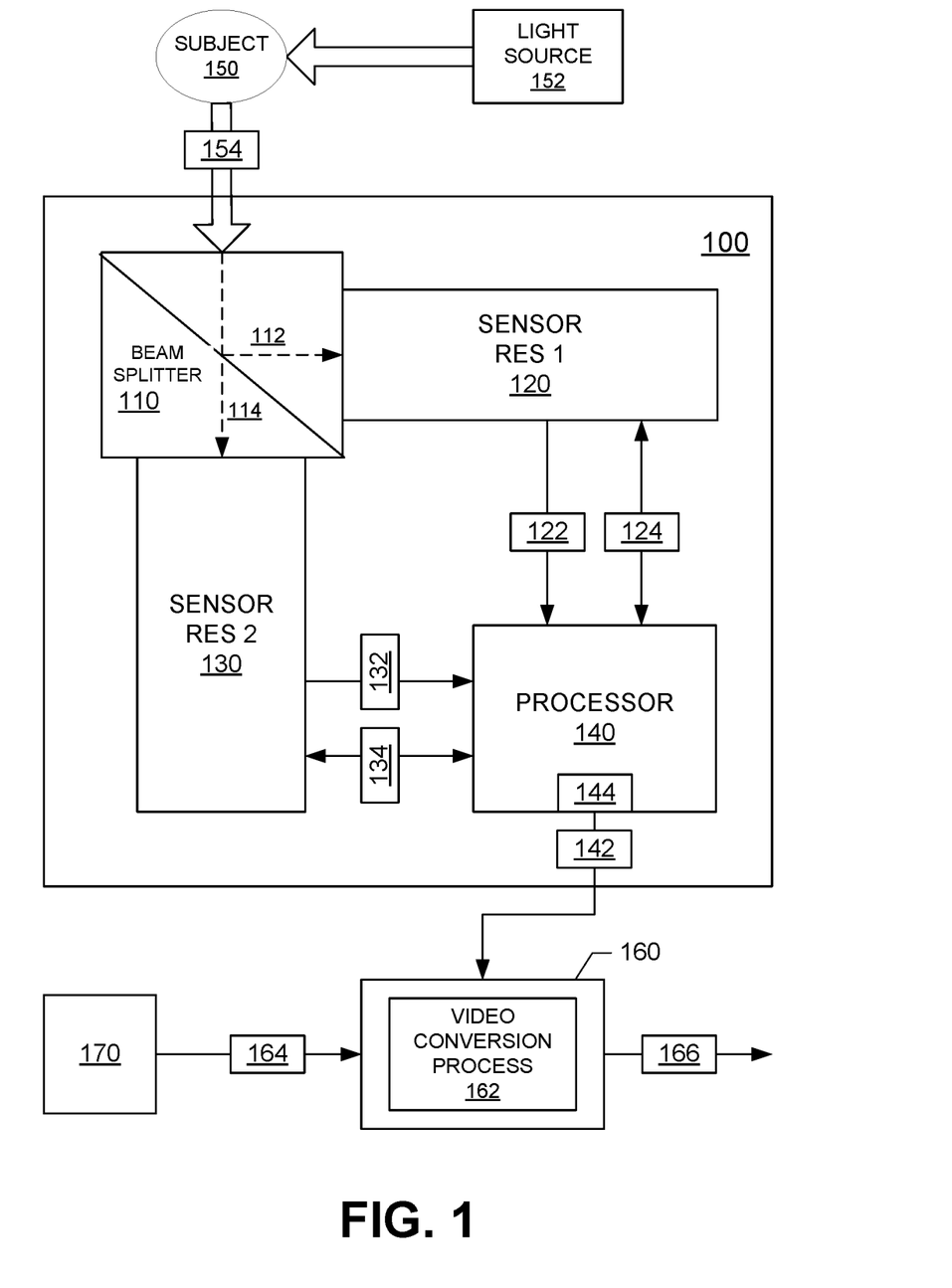
FIG. 1 is a block diagram of a video system to generate training data for developing a video conversion process in accordance with one implementation of the present disclosure.

FIG. 1 is a block diagram of a video system 100 to generate training data for developing a video conversion process in accordance with one implementation of the present disclosure. In the illustrated implementation of FIG. 1, the video system 100 includes a beam splitter 110, a first sensor 120, a second sensor 130, and a processor 140. The video system 100 may also include a machine learning system 160 including a video conversion process 162. In one implementation, the first sensor 120 and the second sensor 130 are coupled to the beam splitter 110. Although the video system 100 of FIG. 1 shows only two sensors, other implementations may include more than two sensors having multiple resolutions. In one implementation, the video system 100 is used in a video production or studio environment.

In the illustrated implementation of FIG. 1, the subject 150 is illuminated with light by the light source 152 (e.g., a visible light source including light from the natural environment, an infra-red (IR) light source, and/or light sources of other spectrums) and the beam of light 154 is reflected toward the beam splitter 110. The beam splitter 110 receives the beam of light 154 and splits the beam 154 into two identical beams and directs a first beam 112 toward the first sensor 120 and a second beam 114 toward the second sensor 130.

In one implementation, the first sensor 120 senses and processes the first beam 112 to generate a first video 122 having a first resolution. The second sensor 130 may sense and process the second beam 114 to generate a second video 132 having a second resolution. Thus, in one implementation, the first sensor 120 transmits the first video 122 to the processor 140 and the second sensor 130 transmits the second video 132 to the processor 140. As described above, the first video 122 and the second video 132 have the identical spatial perspective since the videos 122, 132 come from the same source (i.e., the beam splitter 110). That is, the timestamps, position information, perspective, and lighting of the two videos 122, 132 are the same, but the data resolutions are different.

In one implementation, the processor 140 receives and processes the first video 122 and the second video 132 to generate training data 142 (having two training sample videos) for the machine learning system 160 to be used in the video conversion process 162. The two sample videos of the training data 142 are captured for the same image, so the training data is of higher quality and easier to use for more effective improvement of the machine learning system that the previous systems. In one implementation, the processor 140 includes a formatter 144 which processes the videos 122, 132 to generate the training data 142 by formatting and/or encapsulating the first video 122 and the second video 132 into the training data 142 so that the machine learning system 160 can properly use the training data 142 in the video conversion process 162.

In one implementation, the resolutions of the first and second sensors 120, 130 are selected based on the resolutions of input and output data for the video conversion process 162 in the machine learning system 160. For example, if the video conversion process 162 is programmed to up convert a standard definition (SD) video stream into a high definition (HD) video stream, the first resolution of the first sensor 120 may be selected as SD and the second resolution of the second sensor 130 may be selected as HD. In another implementation, the resolutions of the first and second sensors 120, 130 are programmed, controlled, and/or adjusted by the processor 140 using control/reporting messages 124, 134 sent between the processor 140 and the sensors 120, 130, respectively. In an alternative implementation, the first sensor 120 and the second sensor 130 are configured as programmable sensors, which can be programmed using control/reporting messages 124, 134 by the processor 140. Thus, the first sensor 120 and the second sensor 130 can be programmed to sense different characteristics including different resolutions.

To develop the machine learning system and improve its process for converting the first resolution data to the second resolution data, a training system (e.g., the video system 100) creates and provides training data to the machine learning system. One type of training data is two video datasets for the same image at different resolutions.

In one implementation, the video system 100 includes the video conversion process 162 used for converting video from a television archive 170 using the machine learning system 160. In FIG. 1, the television archive 170 may include many assets for television programs or other television content. Each asset stored in the archive 170 may include a collection of analog information or video data stored in one of several resolutions, such as standard definition (SDTV, such as 480i), high definition (HDTV, such as 1080p), and ultra-high definition (UHDTV, such as 3840 pixels by 2160 pixels). It is useful to convert an asset that is only stored in one resolution to another resolution. In one implementation, the machine learning system 160 converts a first video asset 164 (e.g., a television program) from the first resolution (e.g., SDTV resolution) to the second resolution (e.g., HDTV resolution) to output a second video asset 166. In another implementation, a video conversion system including the video conversion process, the machine learning system, and/or the training systems are separate, such as being deployed and operated at different locations by different entities.

Variations to the system are also possible. For example, in one implementation, the system includes multiple sensor rigs, some or all of which have beam splitters. In another implementation, a sensor rig includes a combination of cameras and/or sensors, such as a camera and a sensor (e.g., IR, laser, LIDAR), or two different sensors. In various implementations, the differences between two cameras or sensors can include resolution, color, lens, film or emulation, or other characteristics to support appropriate conversions. In another implementation, the system uses a beam splitter that splits light into three or more beams, each for a respective camera or sensor with different characteristics.

Figure 2:
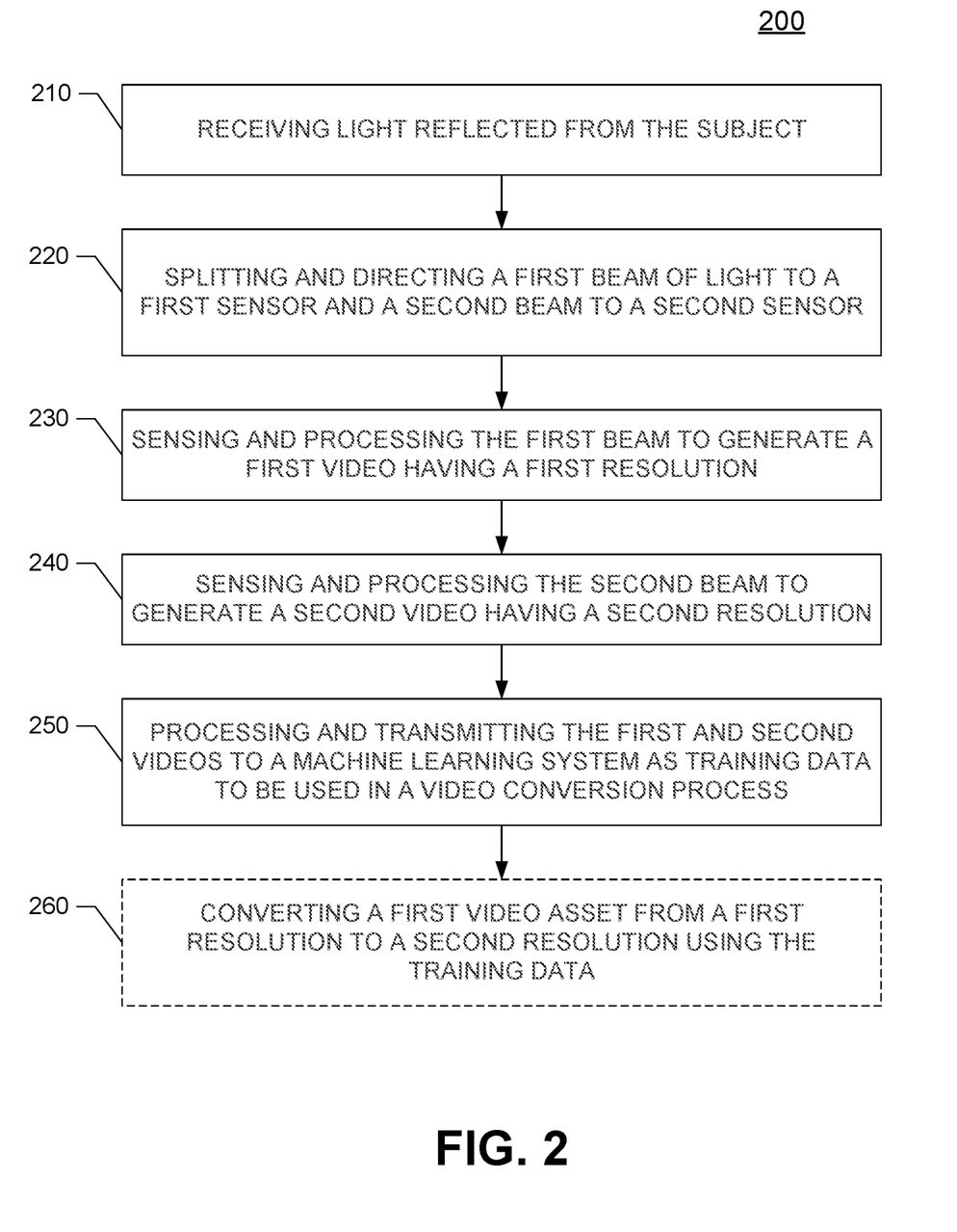
FIG. 2 is a flow diagram of a method to generate training data for developing a video conversion process in accordance with one implementation of the present disclosure.

FIG. 2 is a flow diagram of a method 200 to generate training data for developing a video conversion process in accordance with one implementation of the present disclosure. In FIG. 2, optional aspects are illustrated with a dashed line.

In the illustrated implementation of FIG. 2, a subject is illuminated with light by a light source (e.g., a visible light source including light from the natural environment, an IR light source, and/or light sources of other spectrums) and a beam of light reflected from the subject is received by a beam splitter, at step 210. The beam splitter receives the beam of light, at step 210, and splits the beam into two identical beams and directs a first beam toward a first sensor and a second beam toward a second sensor, at step 220. Although the receiving and the beam splitting processes are performed by a beam splitter, the means for performing steps 210 and 220 may include other apparatuses and/or software processes/controls to receive and split a beam of light.

In one implementation, the first sensor senses and processes the first beam to generate a first video having a first resolution, at step 230. The second sensor may sense and process the second beam to generate a second video having a second resolution, at step 240. Thus, in one implementation, the first sensor transmits the first video to a processor and the second sensor transmits the second video to the processor. Although the receiving, processing, and generating processes are performed by two or more sensors, the means for performing steps 230 and 240 may include other apparatuses and/or software processes/controls to receive, process, and generate two or more videos of different resolutions.

As described above, the first video and the second video have the identical spatial perspective since the videos come from the same source (i.e., the beam splitter). That is, the timestamps, position information, perspective, and lighting of the two videos are the same, but the data resolutions are different. In one implementation, the generated first video and second video are processed by a processor and transmitted to a machine learning system, at step 250, as training data to be used in a video conversion process. The two sample videos of the training data are captured for the same image, so the training data is of higher quality and easier to use for more effective improvement of the machine learning system that the previous systems. Although the processing and transmitting processes are performed by a processor, the means for performing step 250 may include other apparatuses and/or software processes/controls to process and transmit the training videos of different resolutions.

In one implementation, the video conversion process uses the training data to convert an asset that is only stored in one resolution to another resolution, at step 260. In one implementation, the video conversion process converts a first video asset (e.g., a television program) from the first resolution (e.g., SDTV resolution) to the second resolution (e.g., HDTV resolution) to output a second video asset. Although the conversion process is performed by a video conversion process, the means for performing step 260 may include other apparatuses and/or software processes/controls to convert an asset that is only stored in one resolution to another resolution.

Figure 3A:
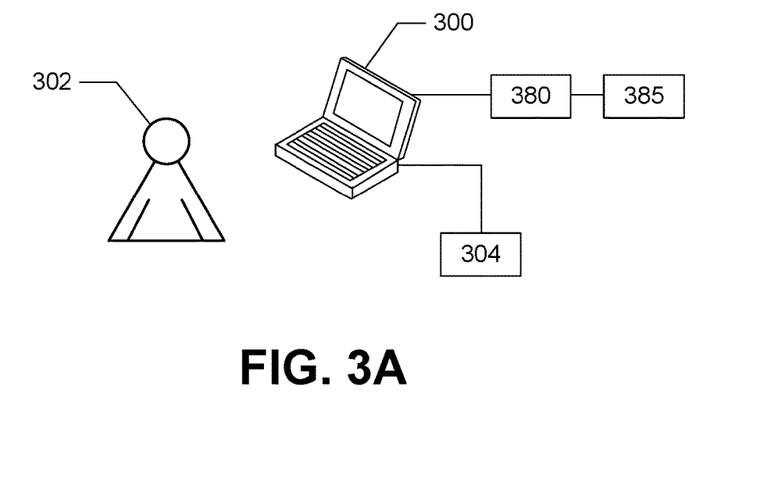
FIG. 3A is a representation of a computer system and a user in accordance with an implementation of the present disclosure.

FIG. 3A is a representation of a computer system 300 and a user 302 in accordance with an implementation of the present disclosure. The user 302 uses the computer system 300 to implement a training data generating application 390 to generate training data for developing a video conversion process as illustrated and described with respect to the processor 140 in FIG. 1 and the method 200 in FIG. 2.

Figure 3B:
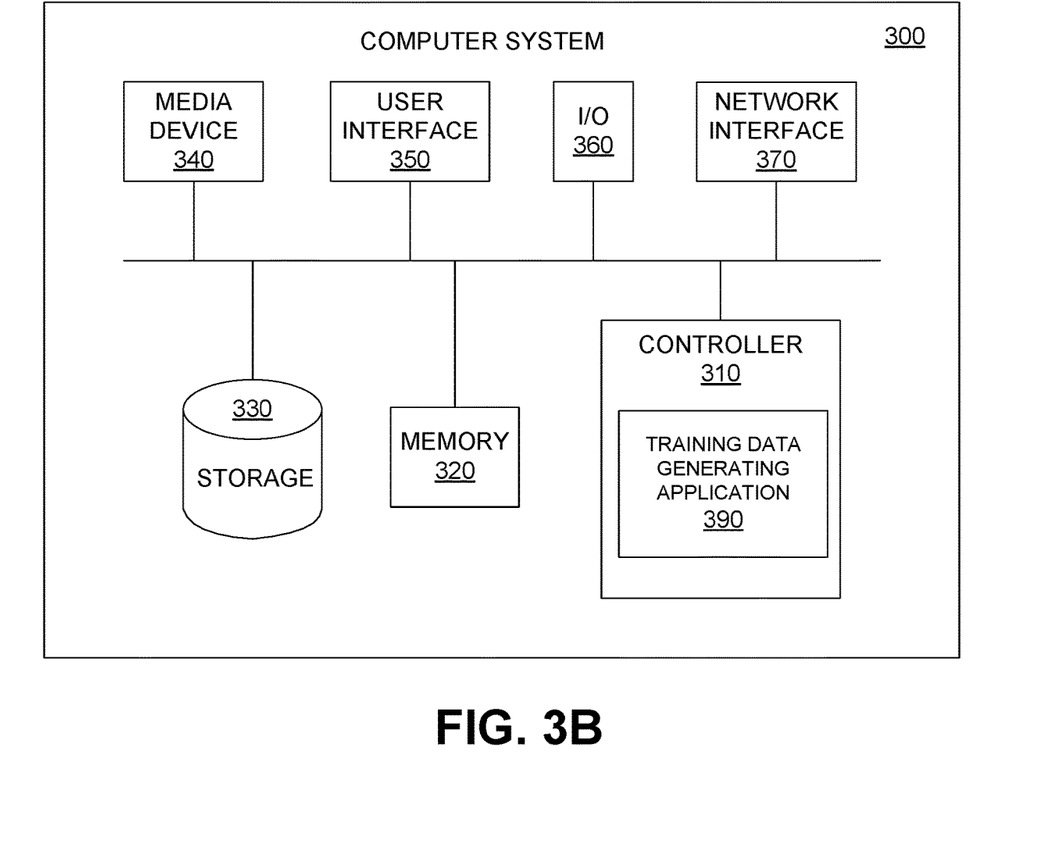
FIG. 3B is a functional block diagram illustrating the computer system hosting the training data generating application in accordance with an implementation of the present disclosure.

The computer system 300 stores and executes the training data generating application 390 of FIG. 3B. In addition, the computer system 300 may be in communication with a software program 304. Software program 304 may include the software code for the training data generating application 390. Software program 304 may be loaded on an external medium such as a CD, DVD, or a storage drive, as will be explained further below.

Furthermore, the computer system 300 may be connected to a network 380. The network 380 can be connected in various different architectures, for example, client-server architecture, a Peer-to-Peer network architecture, or other type of architectures. For example, network 380 can be in communication with a server 385 that coordinates engines and data used within the training data generating application 390. Also, the network can be different types of networks. For example, the network 380 can be the Internet, a Local Area Network or any variations of Local Area Network, a Wide Area Network, a Metropolitan Area Network, an Intranet or Extranet, or a wireless network.

FIG. 3B is a functional block diagram illustrating the computer system 300 hosting the training data generating application 390 in accordance with an implementation of the present disclosure. A controller 310 is a programmable processor and controls the operation of the computer system 300 and its components. The controller 310 loads instructions (e.g., in the form of a computer program) from the memory 320 or an embedded controller memory (not shown) and executes these instructions to control the system, such as to provide the data processing. In its execution, the controller 310 provides the training data generating application 390 with a software system. Alternatively, this service can be implemented as separate hardware components in the controller 310 or the computer system 300.

Memory 320 stores data temporarily for use by the other components of the computer system 300. In one implementation, memory 320 is implemented as RAM. In one implementation, memory 320 also includes long-term or permanent memory, such as flash memory and/or ROM.

Storage 330 stores data either temporarily or for long periods of time for use by the other components of the computer system 300. For example, storage 330 stores data used by the training data generating application 390. In one implementation, storage 330 is a hard disk drive.

The media device 340 receives removable media and reads and/or writes data to the inserted media. In one implementation, for example, the media device 340 is an optical disc drive.

The user interface 350 includes components for accepting user input from the user of the computer system 300 and presenting information to the user 302. In one implementation, the user interface 350 includes a keyboard, a mouse, audio speakers, and a display. The controller 310 uses input from the user 302 to adjust the operation of the computer system 300.

The I/O interface 360 includes one or more I/O ports to connect to corresponding I/O devices, such as external storage or supplemental devices (e.g., a printer or a PDA). In one implementation, the ports of the I/O interface 360 include ports such as: USB ports, PCMCIA ports, serial ports, and/or parallel ports. In another implementation, the I/O interface 360 includes a wireless interface for communication with external devices wirelessly.

The network interface 370 includes a wired and/or wireless network connection, such as an RJ-45 or "Wi-Fi" interface (including, but not limited to 802.11) supporting an Ethernet connection.

The computer system 300 includes additional hardware and software typical of computer systems (e.g., power, cooling, operating system), though these components are not specifically shown in FIG. 3B for simplicity. In other implementations, different configurations of the computer system can be used (e.g., different bus or storage configurations or a multi-processor configuration).

Figure 4:
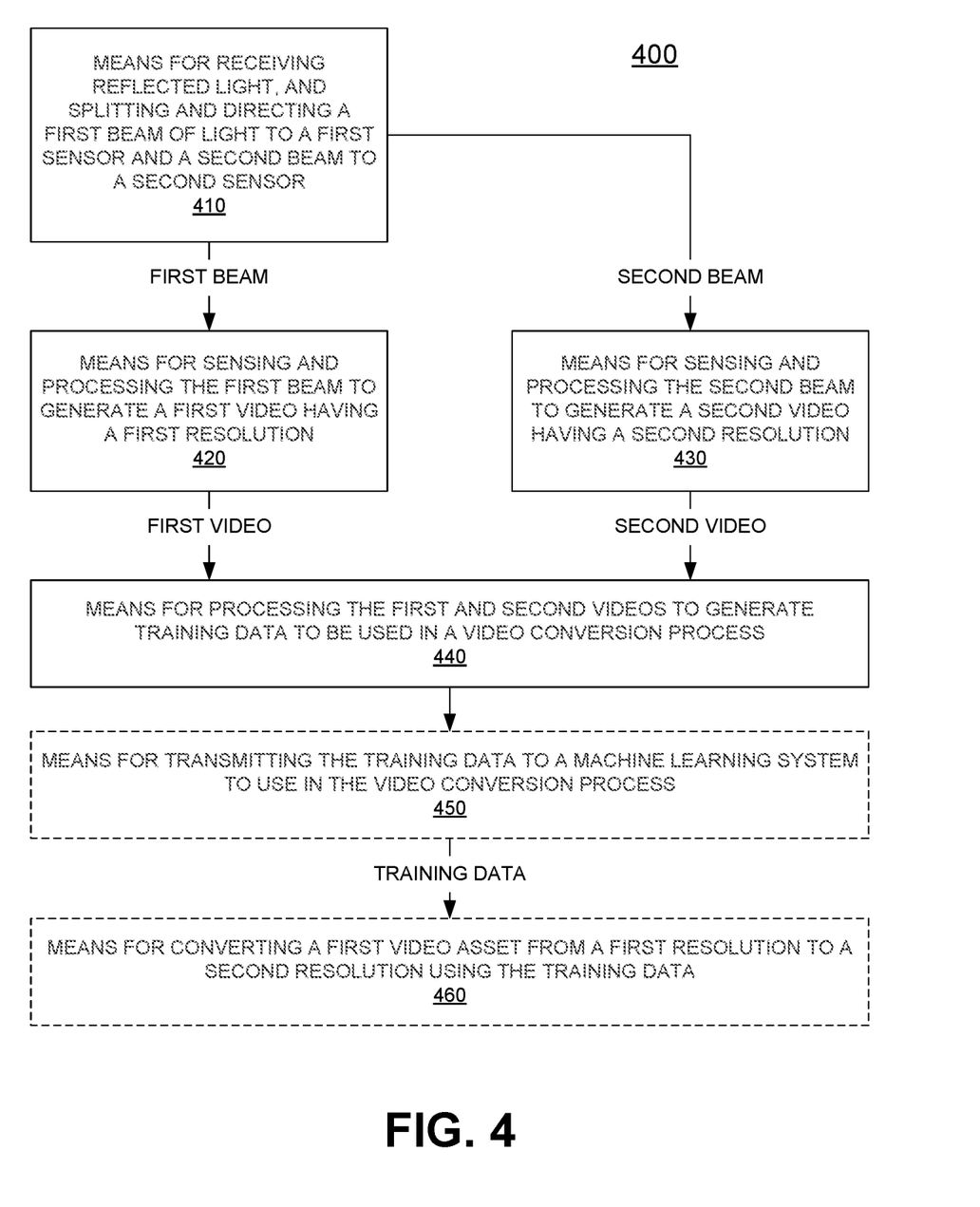
FIG. 4 is a block diagram of an apparatus to generate training data for developing a video conversion process in accordance with one implementation of the present disclosure.

FIG. 4 is a block diagram of an apparatus 400 to generate training data for developing a video conversion process in accordance with one implementation of the present disclosure. In the illustrated implementation of FIG. 4, the apparatus 400 includes means for receiving 410, first means for sensing and processing 420, second means for sensing and processing 430, means for processing 440, means for transmitting 450, and means for converting 460. In FIG. 4, optional blocks are illustrated with a dashed line.

Initially, a subject is illuminated with light by a light source (e.g., a visible light source including light from the natural environment, an IR light source, and/or light sources of other spectrums). In the illustrated implementation of FIG. 4, the means for receiving 410 receives a beam of light reflected from the subject. The means for receiving 410 may also split the beam into two identical beams and direct a first beam toward a first sensor and a second beam toward a second sensor. In one implementation, the means for receiving 410 includes a beam splitter. In another implementation, the means for receiving 410 includes other optical devices, optical apparatuses, and/or software processes/controls such mirrors to receive and split a beam of light.

The first means for sensing and processing 420 may sense and process the first beam to generate a first video having a first resolution. The second means for sensing and processing 430 may sense and process the second beam to generate a second video having a second resolution. Thus, in one implementation, the first means for sensing and processing 420 transmits the first video to a processor and the second means for sensing and processing 430 transmits the second video to the processor. In one implementation, the first means for sensing and processing 420 and the second means for sensing and processing 430 are configured as first and second sensors or cameras, respectively, which sense or capture the received beams and generate videos of different resolutions. In other implementations, the first means for sensing and processing 420 and the second means for sensing and processing 430 are configured as sensor rigs including a combination of cameras and/or sensors, such as a camera and a sensor (e.g., IR, laser, LIDAR), or two different sensors which generate videos of different resolution, color, lens, film or emulation, or other characteristics.

In one implementation, the means for processing 440 processes the first and second videos to generate training data including first and second training videos. The training data may be used in a video conversion process. The means for transmitting 450 may then transmit the generated training data including the first and second training videos to a machine learning system as training data to be used in the video conversion process. Since the two training videos (i.e., training data) are captured for the same image, the training data is of higher quality and easier to use for more effective improvement of the machine learning system that the previous systems. In one implementation, each of the means for processing 440 and the means for transmitting 450 is configured as a processing unit or computing unit. In another implementation, each of the means for processing 440 and the means for transmitting 450 is configured as a computer including software processes/controls to process and transmit the training videos of different resolutions, colors, lenses, films or emulations, or other characteristics.

In one implementation, the means for converting 460 uses the training data to convert an asset that is only stored in one resolution to another resolution. For example, the means for converting 460 converts a first video asset (e.g., a television program) from the first resolution (e.g., SDTV resolution) to the second resolution (e.g., HDTV resolution) to output a second video asset. In one implementation, the means for converting 460 may be configured as a video conversion system to convert an asset that is only stored in one resolution to another resolution. In other implementations, the means for converting 460 may be configured as a general converter to convert an asset that is in one generic characteristic (e.g., color) to another generic characteristic. In one implementation, means for converting 460 also receives an asset having the first characteristic and stored in an archive, and converts the asset from the first characteristic to the second characteristic using the training data.

The descriptions herein of the disclosed implementations are provided to enable any person skilled in the art to make or use the present disclosure. Numerous modifications to these implementations would be readily apparent to those skilled in the art, and the principals defined herein can be applied to other implementations without departing from the spirit or scope of the present disclosure. Although the above description includes systems and methods to generate training data for video conversion in video production including the film production and the broadcast, the described systems and methods are applicable in other fields. For example, in addition to the video production for movies or television, implementations of the systems and methods can be applied and adapted for other applications, such as virtual reality content, virtual production (e.g., virtual reality environments), or motion capture.

All features of each of the above-discussed examples are not necessarily required in a particular implementation of the present disclosure. Further, it is to be understood that the description and drawings presented herein are representative of the subject matter which is broadly contemplated by the present disclosure. It is further understood that the scope of the present disclosure fully encompasses other implementations that may become obvious to those skilled in the art and that the scope of the present disclosure is accordingly limited by nothing other than the appended claims.

The invention claimed is:

1. A system to generate training data for developing a machine learning video conversion process used in video production, the system comprising:
   a beam splitter to receive a beam of light reflected from a subject, and to split the beam of light into two identical beams having an identical spatial perspective, a first beam and a second beam;
   a plurality of sensors including a first sensor and a second sensor,
   the first sensor configured to sense and process the first beam from the beam splitter to generate a first video having a first resolution, the first sensor to store the first video in an archive, and
   the second sensor configured to sense and process the second beam from the beam splitter to generate a second video having a second resolution, the second sensor to store the second video in the archive,
   wherein the first and second resolutions of the first and second sensors are selected based on resolutions of input and output data for the machine learning video conversion process,
   wherein having the identical spatial perspective obviates a need for calibration of positions of the first and second sensors; and
   a converter to receive the first stored video and the second stored video from the archive, and to generate the training data having two sample videos for the machine learning video conversion process.

2. The system of claim 1, wherein the converter further comprises a formatter to format the first video and the second video into the training data for the machine learning video conversion process.

3. The system of claim 1, wherein the archive includes a television archive including one or more assets for television programs or other television content.

4. The system of claim 3, wherein the converter uses the training data to convert a television program from the first resolution to the second resolutions.

5. The system of claim 1, wherein the first sensor and the second sensor are configured as programmable sensors to sense different colors.

6. The system of claim 1, wherein the plurality of sensors includes a combination of cameras and sensors.

7. The system of claim 6, wherein the sensors include at least one of infra-red (IR) sensors, laser sensors, and laser imaging, detection, and ranging (LIDAR) sensors.

8. A method to generate training data for developing a machine learning video conversion process used in video production, the method comprising:
   receiving a beam of light reflected from a subject and splitting the beam of light into at least two identical beams having an identical spatial perspective, a first beam and a second beam;
   directing the first beam toward a first sensor and the second beam toward a second sensor,
   wherein having the identical spatial perspective obviates a need for calibration of positions of the first and second sensors;
   sensing and processing the first beam by a first sensor to generate a first video having a first resolution;
   storing the first video in an archive;
   sensing and processing the second beam by a second sensor to generate a second video having a second resolution;
   storing the second video in the archive;
   processing the first stored video and the second stored video to generate the training data having two sample videos for the machine learning video conversion process using the two identical beams and each beam being processed by one of the first and second sensors.

9. The method of claim 8, further comprising
transmitting the training data to a machine learning system.

10. The method of claim 9, wherein the machine learning system includes the video conversion process.

11. The method of claim 8, wherein the archive includes a television archive including one or more assets for television programs or other television content.

12. An apparatus to generate training data for developing a machine learning video conversion process used in video production, the apparatus comprising:
   means for receiving and splitting a beam of light reflected from a subject into at least two identical beams having an identical spatial perspective, a first beam and a second beam;
   means for directing the first beam toward a first sensor and the second beam toward a second sensor,
   wherein having the identical spatial perspective obviates a need for calibration of positions of the first and second sensors;
   first means for sensing and processing the first beam to generate a first video having a first resolution;
   second means for sensing and processing the second beam to generate a second video having a second resolution;
   means for storing the first and second video; and
   means for processing the first stored video and the second stored video to generate the training data having two sample videos for the machine learning video conversion process using the two identical beams and each beam being processed by one of the first and second means for sensing and processing.

13. The apparatus of claim 12, further comprising means for transmitting the training data to a machine learning system.

* * * * *